(12) United States Patent
Terres et al.

(10) Patent No.: US 8,539,550 B1
(45) Date of Patent: Sep. 17, 2013

(54) MULTI-PATTERN AUTHENTICATION GESTURES

(75) Inventors: Nathan Terres, Campbell, CA (US); Jonathan M. Mandell, Waltham, MA (US); Steven A. Sholtis, El Dorado Hills, CA (US); Ryan J. Yarwood, El Dorado Hills, CA (US)

(73) Assignee: Intuit Inc., Mountain View, CA (US)

( * ) Notice: Subject to any disclaimer, the term of this patent is extended or adjusted under 35 U.S.C. 154(b) by 773 days.

(21) Appl. No.: 12/128,895

(22) Filed: May 29, 2008

(51) Int. Cl.
*G06F 21/00* (2013.01)
(52) U.S. Cl.
USPC ........... 726/2; 726/5; 726/16; 726/26; 726/28
(58) Field of Classification Search
USPC ....................................... 726/5, 28
See application file for complete search history.

(56) References Cited

U.S. PATENT DOCUMENTS

| | | | | |
|---|---|---|---|---|
| 4,805,222 A | * | 2/1989 | Young et al. | 382/115 |
| 5,425,102 A | * | 6/1995 | Moy | 713/183 |
| 5,611,048 A | * | 3/1997 | Jacobs et al. | 726/5 |
| 7,103,200 B2 | * | 9/2006 | Hillhouse et al. | 382/115 |
| 2007/0061590 A1 | * | 3/2007 | Boye et al. | 713/186 |
| 2008/0092245 A1 | * | 4/2008 | Alward et al. | 726/28 |
| 2009/0085877 A1 | * | 4/2009 | Chang et al. | 345/173 |
| 2009/0102800 A1 | * | 4/2009 | Keenan | 345/173 |

OTHER PUBLICATIONS

Sutcu et al., Secure Biometric Templates from Fingerprint-Face Features, CVPR 07. IEEE Conference on Computer Vision and Pattern Recognition, p. 1-6, Jun. 17-22, 2007.

* cited by examiner

*Primary Examiner* — Kambiz Zand
*Assistant Examiner* — Imhotep Durham
(74) *Attorney, Agent, or Firm* — Park, Vaughan, Fleming & Dowler, LLP

(57) ABSTRACT

Apparatus, methods, and computer program products are disclosed for using gestures to authenticate a principal. The method acquires a multi-pattern authentication gesture that has multiple input patterns. The multiple input patterns have a temporal dimension. At least two of the multiple input patterns overlap in the temporal dimension. The multi-pattern authentication gesture also has a duration. The method compares whether the multi-pattern authentication gesture is sufficiently similar to an available gesture template over a portion of the duration and assigns a level-of-trust to the principal responsive to the comparison. The apparatus and program products use the method.

18 Claims, 8 Drawing Sheets

MULTI-PATTERN AUTHENTICATION GESTURES

BACKGROUND

Related Art

In the computer domain, "Authentication" and "Authorization" are two interrelated but separate security concepts. Authentication is a process of identifying a principal (for example, a user); while authorization is the process of determining if an authenticated principal has access to principal-requested resource(s). Authentication is typically achieved by the principal sharing authentication credentials (that verify the principal's identity) with the system.

In many cases, authorization is tied to group membership, where users' group affiliations determine their access rights. For example, system administrators may belong to an "admin" group, while engineers may belong to an "engineering" group. Authorization is often determined by a combination of a group affiliation, a set of restricted destinations, the user's access method to the computer system, etc., and physical barriers. Authorization is typically defined by a set of policies that define the access rights for the authenticated principal.

Authentication for human principals (users) is based on one or more Factors. These Factors are commonly classified as:

1. Something the principal "has" (for example but without limitation, ID card, security token, software token, phone, or cell phone).
2. Something the principal "knows" (for example but without limitation, a password, pass phrase, or personal identification number (PIN)).
3. Something the principal "is" or "does" (for example but without limitation, fingerprint or retinal pattern, DNA sequence, signature and/or voice recognition, unique bio-electric signals, or another biometric identifier).

A multi-Factor authentication requires the use of solutions from two or more of the three classifications. The use of multiple solutions from one classification is not a multi-Factor authentication.

An account identifier is commonly assigned to a user during enrollment. The account identifier is generally public information. A commonly used authentication method for the general computer user is the user specifying the account identifier and providing a password to access the account. More advanced authentication procedures authentication methods can include the use of smart cards, time based tokens, etc. as well as a password (Factors 1 and 2), or the use of biometric information (Factors 2 and 3), etc.

Factor 2 information is generally provided to the authentication system as audio, keyboard or keypad input. Most Factor 2 information is very insecure as the information the user knows can be known by others (for example, passwords can be memorized by watching the user's input of the password; the password can be guessed—for example, guessing variations of the name of the user's spouse; the password can be written down by the user for later reference and discovered by another, the password can be shared by the user with another, etc.). In addition, because the Factor 2 information is so insecure, it is common practice to require that the Factor 2 information periodically change. Because the Factor 2 information is changed so often, the information must be simple enough such that no or limited training is required for the user to learn the changed information (for example when the password change is imposed, the user must select and memorize a sequence of mixed case letters and digits as the new password).

One skilled in the art will understand the technology used for the secure storage of biometric templates, and for the secure comparison of a biometric input against the biometric template. For example, see: *Secure Biometric Templates from Fingerprint-Face Features*, by Sutcu et al., CVPR 07. IEEE Conference on Computer Vision and Pattern Recognition, pg. 1-6, 17-22 Jun. 2007.

One advantage of Factor 2 information is that it can be provided by one user to another user. Generally this is not desired, but there are examples where family-members need/want to share Factor 2 information so as to be able to access another's account if the sharing user becomes incapacitated. In addition, there are situations where an employer needs to gain access to the employer-owned computer system used by an employee. While the employer's IT department can generally gain access to any file on the employee-used computer system, the IT department cannot decrypt information that has been encrypted by the employee and stored in the file using credentials generated by the employee.

DETAILED DESCRIPTION

One aspect of the disclosed technology is a computer controlled method for authenticating a principal. The method acquires a multi-pattern authentication gesture that has multiple input patterns. The multiple input patterns have a temporal dimension. At least two of the multiple input patterns overlap in the temporal dimension. The multi-pattern authentication gesture also has a duration. The method compares whether the multi-pattern authentication gesture is sufficiently similar to an available gesture template over a portion of the duration and assigns a level-of-trust to the principal responsive to the comparison. Other aspects of the disclosed technology include apparatus that perform the method and program products that contain code that when executed by a computer cause the computer to perform the method.

This technology can be applied using a general purpose computer programmed to perform the method as well as logic circuits that provide part or all of the method (or combination of computer, software logic, and/or hardware logic). An example of such a computer is illustrated in FIG. 1.

Multi-pattern input devices (for example, multi-touch sensor devices, computationally active input surfaces, telephones, video cameras, computer video input devices, keyboards, etc.) are starting to become available to the public.

Figure 1:
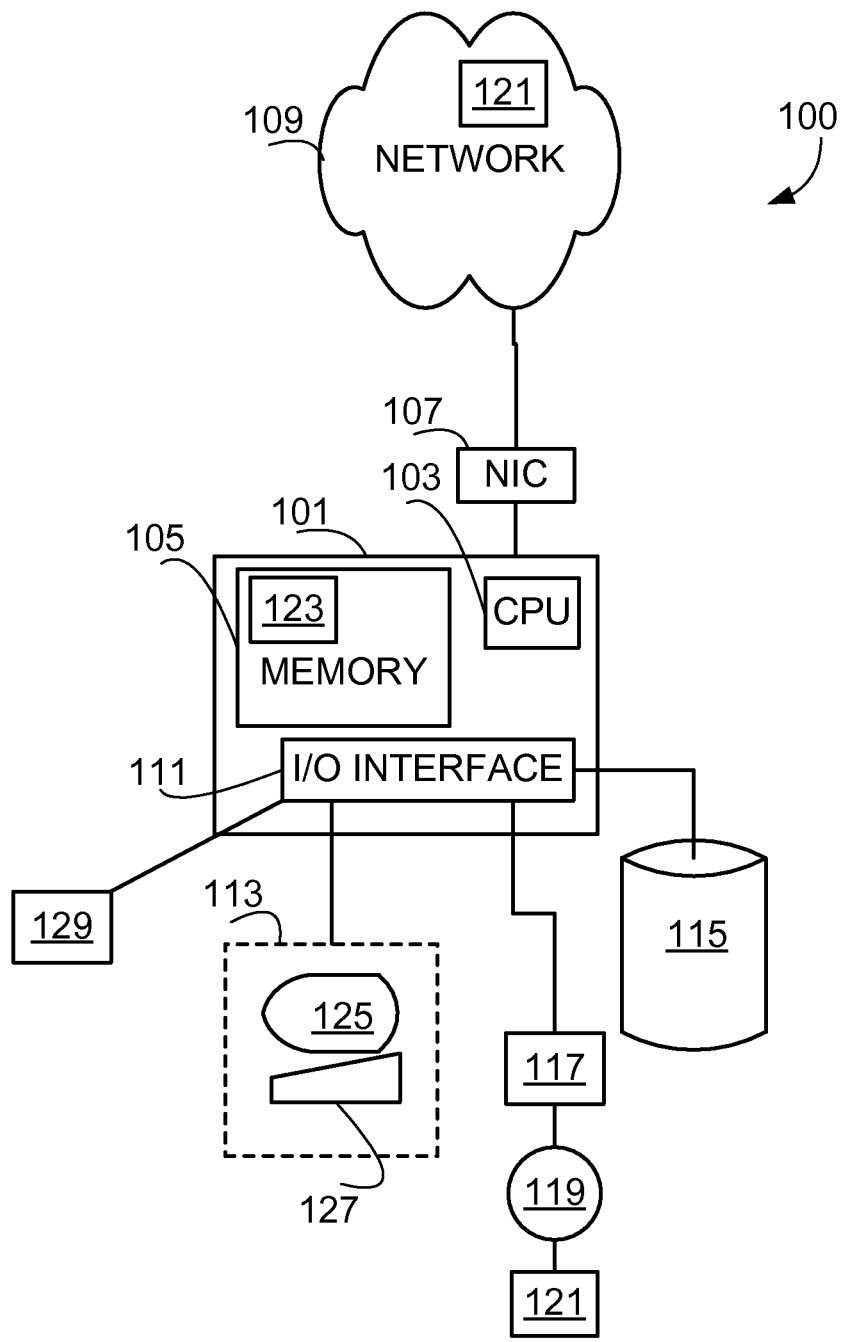
FIG. 1 illustrates a computer system that can implement the disclosed technology.

FIG. 1 illustrates a networked computer system 100 that can incorporate an embodiment. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include a display device 125, a keyboard 127. The networked computer system 100 also includes a multi-pattern input device 129. The multi-pattern input device 129 can be a multi-touch sensor device or other pattern input device and can be accessed over the network 109. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present for all embodiments that implement the techniques disclosed herein. Further, one skilled in the art will understand that computers are ubiquitous within modern devices ranging from as cell phones to vehicles to kitchen appliances etc. and in particular are used for authenticating a person's identity when providing access to controlled systems, information, financial accounts, etc., and physical locations (secure rooms, homes, company buildings, work areas etc.), and containers (such as vehicles, lockboxes, etc.).

Using the technology disclosed herein enables a user to authenticate his/herself using a multi-pattern authentication gesture. The inventors believe that multi-pattern authentication gestures are much more secure than most Factor 2 information because multi-pattern authentication gestures can be very complex while still being quickly input. In addition, when needed multi-pattern authentication gestures can be shared unlike biometric authentication.

Figure 2:
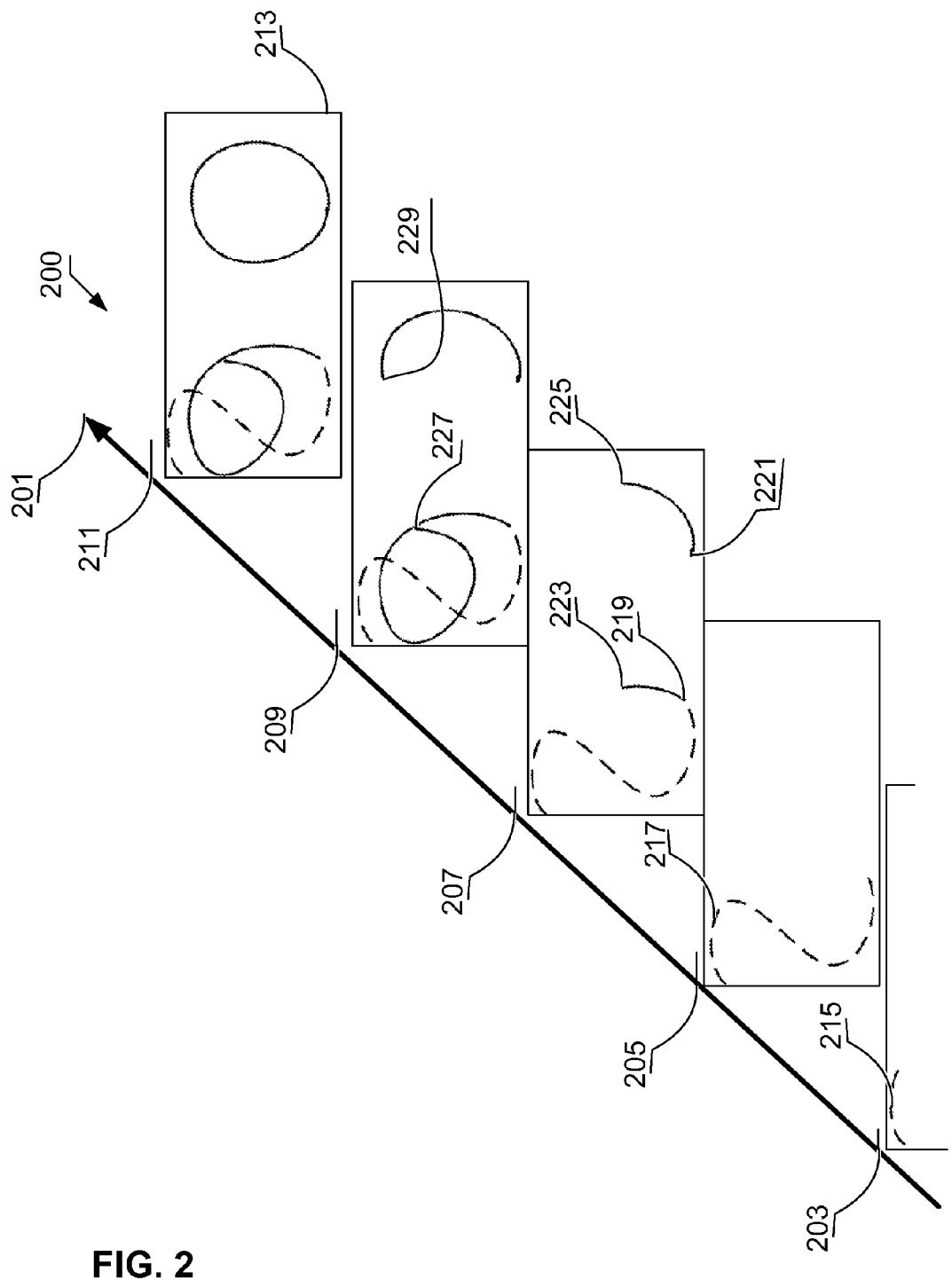
FIG. 2 illustrates the context within which a gesture is created.

FIG. 2 illustrates a gesture creation context 200 that illustrates one method of constructing a multi-pattern authentication gesture. This figure illustrates the construction of a multi-pattern authentication gesture from two patterns detected by a multi-pattern input device such as a multi-touch sensor device. For example, the multi-touch sensor device allows a user to generate multiple patterns (that overlap within the temporal dimension) using multiple fingers. Thus, a multi-pattern authentication gesture includes temporal dimensions as well as positional dimensions (such as two- or three-dimensional position coordinates—for example, the X and Y dimensions of a multi-touch sensor).

In FIG. 2, time flows along a time axis 201 having temporal dimensions some of which are marked at a T1 coordinate 203, a T2 coordinate 205, a T3 coordinate 207, a T4 coordinate 209, and a T5 coordinate 211. The gesture can be constrained within a gesture boundary 213. The gesture boundary 213 can result from the physical characteristics of the multi-pattern input device or from the imposition of a gesture context (for example, on a multi-pattern input device that uses a touch screen, by displaying a context overlay representing the gesture context). For this example, just prior to the T1 coordinate 203, the user has touched the multi-touch sensor device at a single point, and has started to trace "Pattern 1".

At the T1 coordinate 203 the user has completed a gesture starting segment 215 (The dashed portion of Pattern 1 indicates that only a first finger is being used to trace the pattern). At the T2 coordinate 205 the user has continued to form Pattern 1 as shown by a T2 gesture state 217 and the user starts "Pattern 2" using a second finger while continuing to trace Pattern 1 with the first finger such that a T2-to-T3 Pattern 1 increment-start 219 and a T2-to-T3 Pattern 2 start 221 occur at the same time and thus, that Pattern 1 and Pattern 2 start to overlap in the temporal dimension.

At the T3 coordinate 207, Pattern 1 has been extended from the T2-to-T3 Pattern 1 increment-start 219 to a T2-to T3-Pattern 1 increment-end 223 and Pattern 2 has been extended from the T2-to-T3 Pattern 2 start 221 to a T2-to-T3 Pattern 2 increment-end 225.

At the T4 coordinate 209, Pattern 1 is complete and at a T4-Pattern 1-end 227 the user terminates Pattern 1 by lifting the finger that defined Pattern 1 from the multi-touch sensor device. However, the trace of Pattern 2 continues and Pattern 2 has been extended to a T3-to-T4 Pattern increment-end 229. At this point, the overlap in the temporal dimension between Pattern 1 and Pattern 2 can be determined to be the portion of Pattern 1 between the T2-to-T3 Pattern 1 increment-start 219 and the T4-Pattern 1-end 227; and the portion of Pattern 2 between the T2-to-T3 Pattern 2 start 221 and the T3-to-T4 Pattern increment-end 229.

Finally, at the T5 coordinate 211 Pattern 2 is completed and the user terminates Pattern 2 by lifting the finger that defined Pattern 2 from the multi-touch sensor device. The duration of the gesture can be from the time just prior to the T1 coordinate 203 when the user first touched the multi-pattern input device and started to trace Pattern 1—to the T5 coordinate 211 when the user lifted the finger that defined Pattern 2. In some implementations, the duration can result from a start event (such as a button selection) to a corresponding end event. In such case, the multi-pattern authentication gesture could include one or more portions of the temporal dimension where the positional dimension coordinates are absent. For example, the user could activate a start control, start a count of ten, generate patterns that overlap in the temporal dimension, complete the patterns, and wait for a count of six and activate an end control. In addition, some implementations can accept patterns where the positional dimension coordinates do not change over some portion of the temporal dimension. However, it is important that at least two of the patterns created during the duration include the positional dimension during some overlap in the temporal dimension (that is, that at least two patterns are generating positional dimension coordinates at the same time).

For some multi-pattern input devices, the patterns can overlap in the positional dimension coordinates (for example, when using a video image, by moving one hand in front of another hand). In addition, the different patterns can include additional information that can be used as coordinate or attribute information (for example, pressure information, area of touch information, size of pattern, etc.). One skilled in the art will understand that the multi-pattern authentication gesture can be represented by an array of the positional dimension coordinates with respect to the temporal dimension, by a list of events (both of which represent the paths of the patterns), etc. as well as an image taken from the multi-pattern input device that can be stored in a MPEG or MPEG-like representation that captures the changes in the patterns over the duration.

Figure 7:
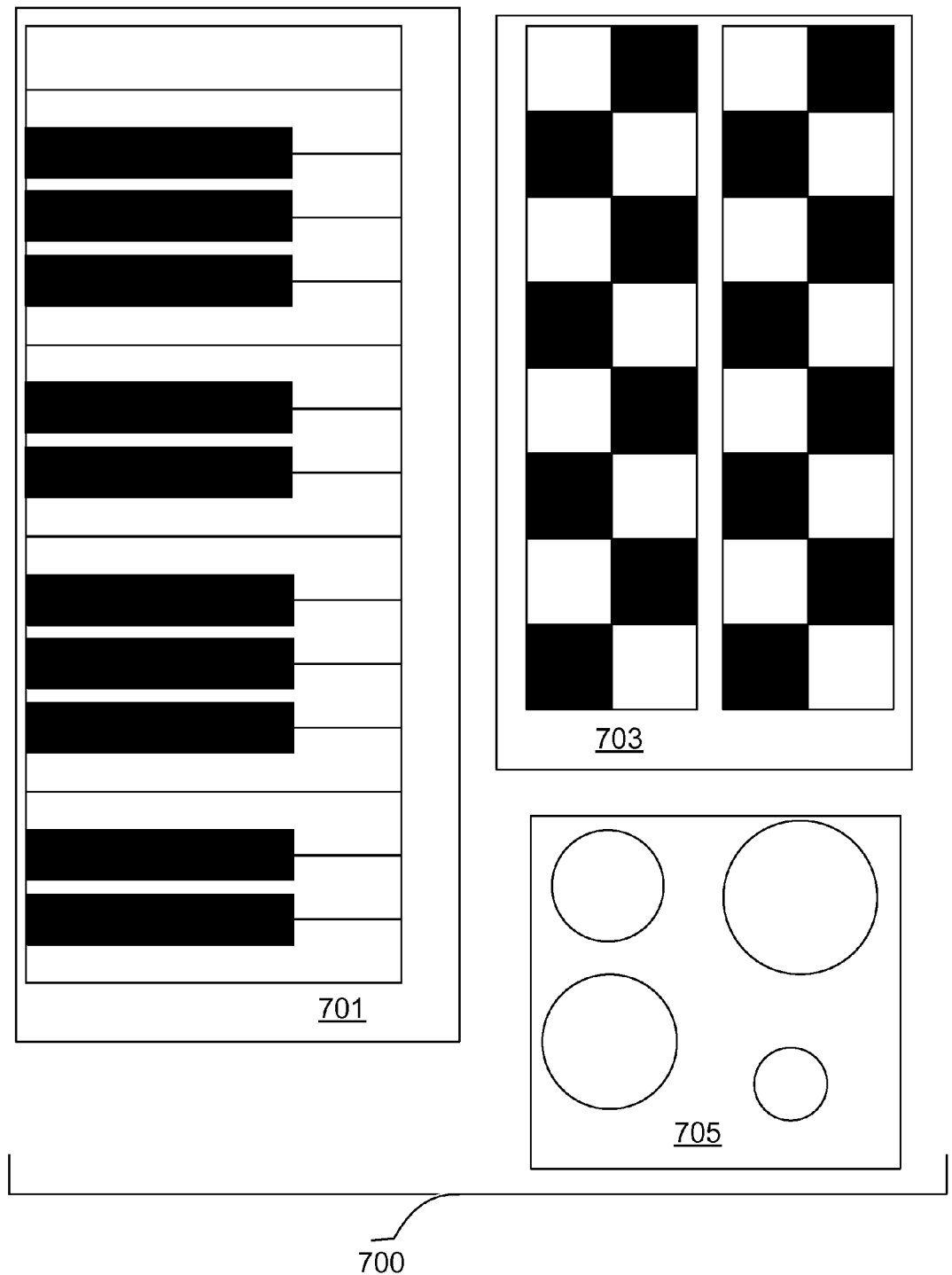
FIG. 7 illustrates examples of context overlays.
Figure 8:
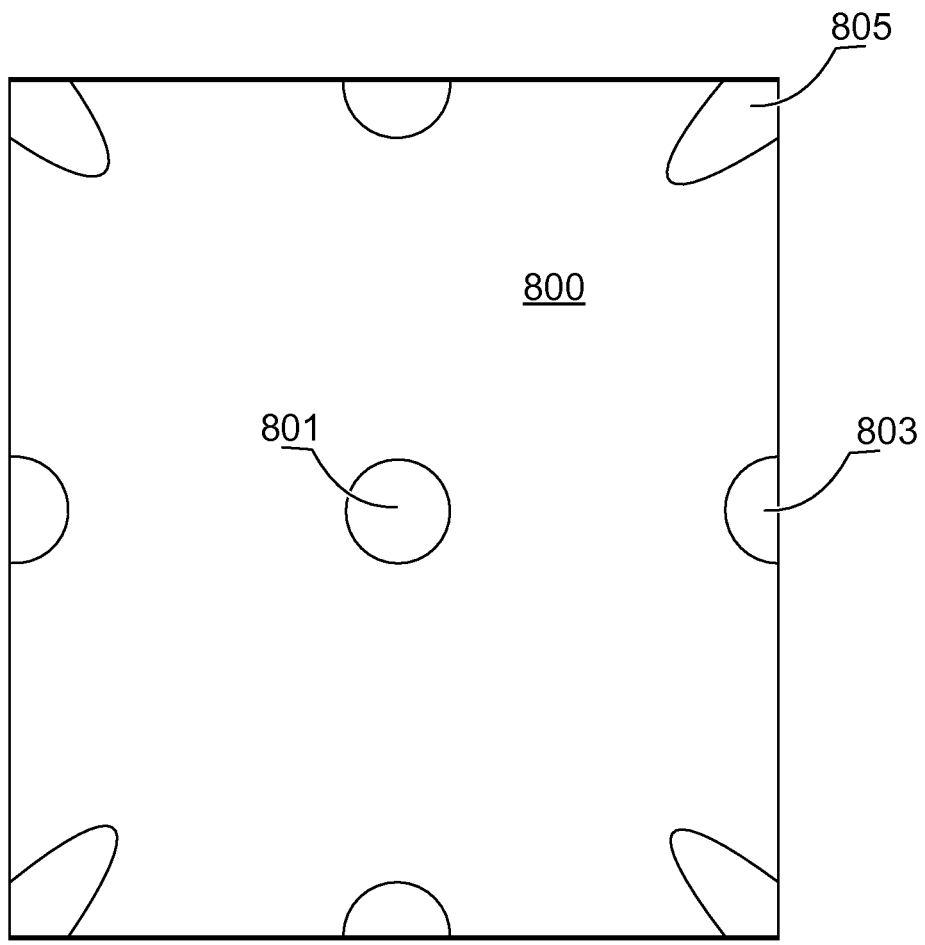
FIG. 8 illustrates an example of a device-specific gesture context.

Some implementations of the technology provide the user with a gesture context within which to perform the gesticulation. Some examples of gesture contexts are shown in FIG. 7 and FIG. 8. The gesture context provides some meaning to the gesture. For example, if the multi-pattern authentication gesture is related to music, the gesture context can be an image of a piano keyboard, such that the gesticulation performed on the multi-pattern input device is similar to playing the music on a piano.

One skilled in the art will understand that there are many known multi-pattern input devices. These devices include any device (or combinations of devices) with the capability to track multiple patterns that overlap in the temporal dimension. For example, these devices extend from multi-touch sensor devices, to multiple single-touch sensor devices, to networked devices, to area-LASER scanners, to video devices, to eye-tracker devices, to motion sensor enabled clothing, to reflective tags, etc. Each of these devices can include software or logic that will track multiple independent gesticulations (that overlap in the temporal dimension) and that can be used to define a multi-pattern authentication gesture.

Furthermore, many computer keyboards can be used to detect when multiple keys are depressed at the same time (multi-keypress keyboards). Such keyboards can be used as a multi-pattern input device (but notice, this usage is not for generating a string of characters, rather for generating keypress patterns that overlap in time—for example, holding keys qwer down simultaneously with keys hjk for fifteen seconds; followed by simultaneous depression of sd and yuio for three seconds (with qwer being held during the transition from hjk to yuio) and qwer transitioning to sd within 200 ms of the establishment of yuio).

Figure 3:
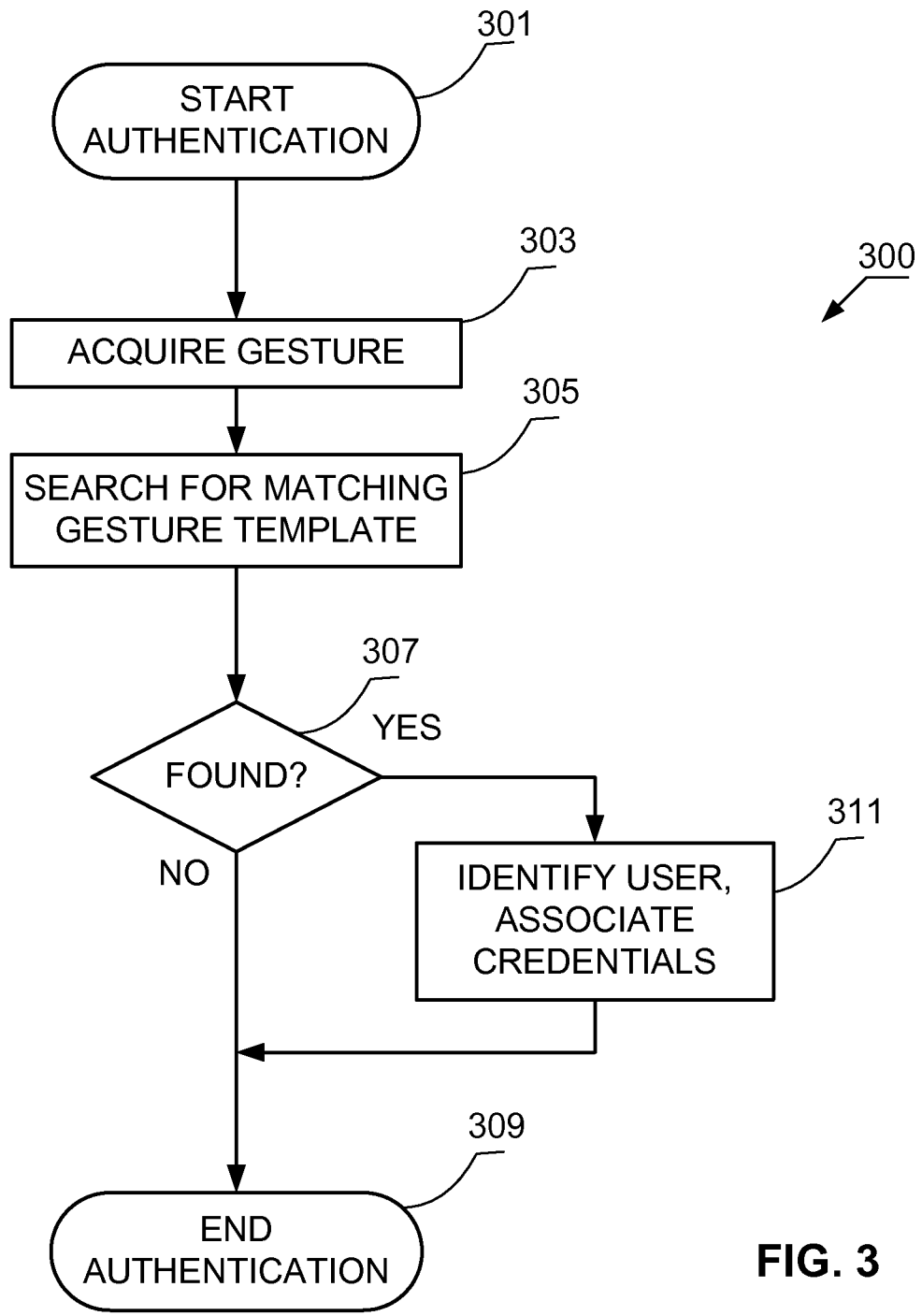
FIG. 3 illustrates an authentication process that can be implemented using the computer system of FIG. 1.

Turning now to how multi-pattern authentication gestures can be used to authenticate a user. FIG. 3 illustrates an authentication process 300 that initiates at a start authentication terminal 301 and continues to an 'acquire gesture' procedure 303. The 'acquire gesture' procedure 303 receives a multi-pattern authentication gesture from the multi-pattern input device. Once the multi-pattern authentication gesture is received, a 'search for gesture match' procedure 305 searches one or more available gesture templates from a gesture library to determine whether any of the available gesture templates sufficiently match the multi-pattern authentication gesture acquired by the 'acquire gesture' procedure 303. A 'found matching gesture template' decision procedure 307 determines whether the 'search for gesture match' procedure 305 was successful. If it was not successful, the authentication process 300 completes through an end authentication terminal 309 without authentication.

However, if the 'found matching gesture template' decision procedure 307 determines that the 'search for gesture match' procedure 305 did sufficiently match one of the available gesture templates, the authentication process 300 continues to 'authenticate principal' procedure 311 that associates the corresponding authentication credentials with the principal (the user who performed the gesticulation). In some implementations, the 'authenticate principal' procedure 311 can also associate the account with the principal, and login the user without the need for the user to provide additional information. In some implementations this procedure can also require another Factor. Then the authentication process 300 completes through the end authentication terminal 309.

In some implementations, the 'search for gesture match' procedure 305 compares the received multi-pattern authentication gesture against the available gesture templates requiring a very tight match between the received the multi-pattern authentication gesture and the matching a gesture template. Other implementations can allow the principal to specify the tolerance for the exactness of the match between the multi-pattern authentication gesture and the gesture template. In some implementations, a gesture template can be identical to its corresponding multi-pattern authentication gesture while in other implementations the gesture template can be a transformation of the multi-pattern authentication gesture. Known technology for storing and comparing biometric authentication information can be used to store the gesture templates and to compare the gesture templates with the input multi-pattern authentication gesture.

Still other implementations can accommodate incremental gesture drifts between the input multi-pattern authentication gesture and the gesture template, and maintain a drift history so that the gesture template can be morphed if the user makes consistent incremental small changes to the multi-pattern authentication gesture over time (changes such as consistent performance errors or embellishments). Such implementations allow the user to teach the multi-pattern authentication gesture to another for a limited-time use, then after the other has completed the use, the user can start incremental embellishments to morph the gesture template such that the other will eventually not be able to use the originally learned multi-pattern authentication gesture. Note that if the user and the other have conflicting performance errors (or if the user starts to embellish while the other is still using the originally learned multi-pattern authentication gesture), the gesture template will not morph as the variation over time will not be consistent.

Some implementations of the technology described herein allow the multi-pattern authentication gesture to be associated with both the user's account and password, such that the multi-pattern authentication gesture alone is sufficient to authenticate the user (although this is not a multi-Factor authentication). Other implementations can use the multi-pattern authentication gesture as a password replacement.

Some implementations of the technology described herein can also present a gesture hint to the user to refresh the user's recollection of the start of the gesticulation. For example, if a multi-pattern authentication gesture is associated with a gesture context, the gesture hint can be presented within the domain of the gesture context. For example, in the music domain the gesture hint could be the start of the music that results from the multi-pattern authentication gesture (presented as an audio playback, by display of a few notes of the start of the music, or presenting an audio "beat" representing the music, etc.). In the domain of the more abstract gesture contexts or of no context at all, the gesture hint can be presented by displaying the start of the multi-pattern authentication gesture.

The terms "presents", "presented" and the like are used to mean that the gesture context is made available to the user in whatever way is suited to the context within which the user is using the multi-pattern input device. For example, on a multi-touch sensor device that has a display capability, the gesture context can be displayed to the user; for a music-related multi-pattern authentication gesture presented the gesture context can be an audible tempo or "beat".

Figure 4:
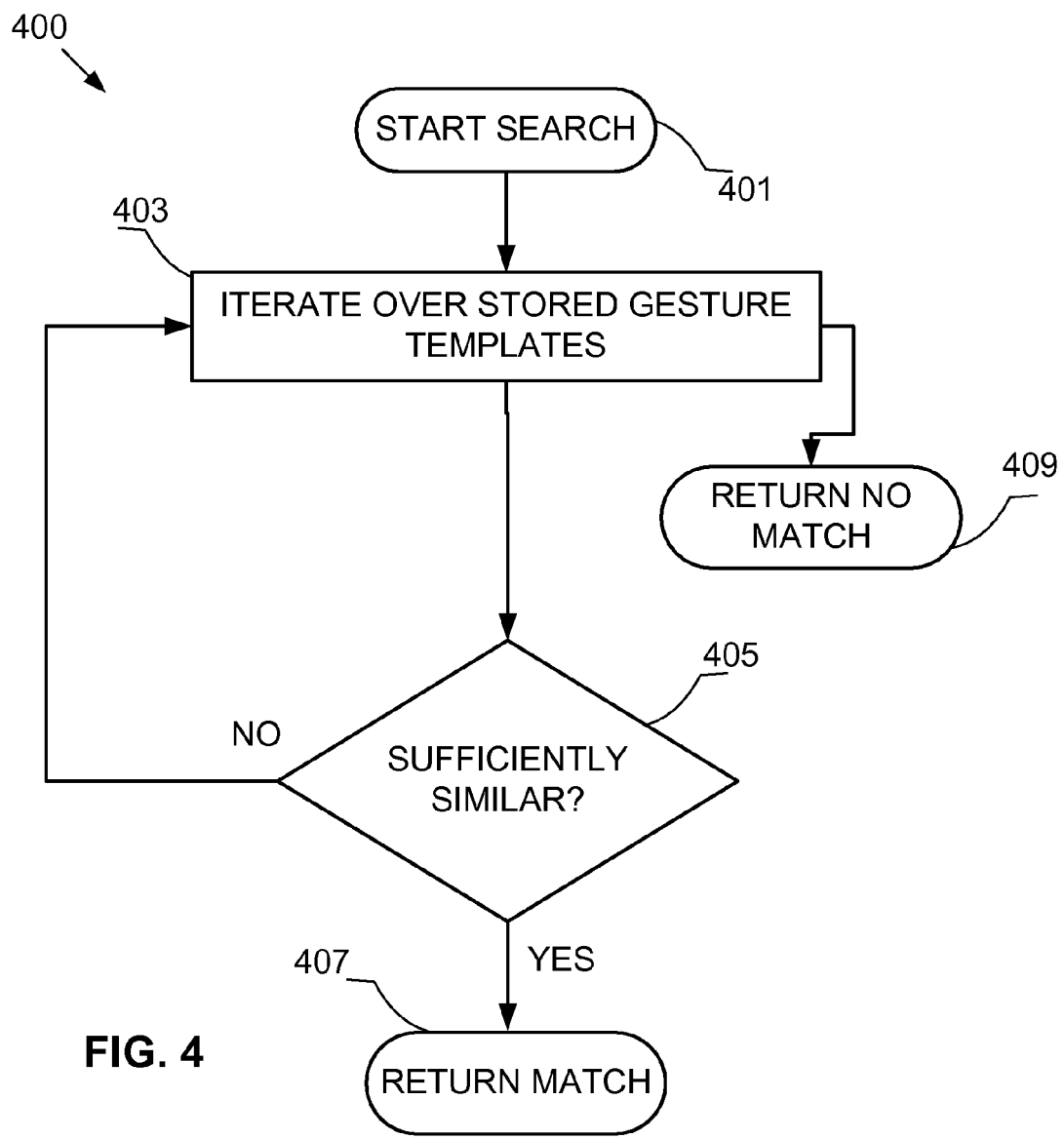
FIG. 4 illustrates a gesture search process that can be invoked from FIG. 3.

The acquired multi-pattern authentication gesture can be matched with an existing gesture template that is associated with an authentication credential. FIG. 4 illustrates a gesture search process 400 that compares an acquired multi-pattern authentication gesture with gesture templates (multi-pattern authentication gestures that have been stored in the gesture library and that are associated with authentication credentials). The gesture search process 400 can be initiated by the 'search for gesture match' procedure 305. The gesture search process 400 initiates at a start terminal 401 and continues to an 'iterate over gesture library' procedure 403 that iterates over a gesture library that contains stored gesture templates to find a match with the acquired multi-pattern authentication gesture. For each stored gesture template that is iterated, a 'sufficiently similar match' procedure 405 evaluates the iterated gesture template with the acquired multi-pattern authentication gesture. If a sufficiently similar match occurs, the gesture search process 400 continues to a match found terminal 407 and terminates with sufficient information to associate the authentication credential (and respective authorization credentials) with the user. However, if all gesture templates in the gesture library have been iterated without a match, the gesture search process 400 continues to a no match terminal 409 and terminates with a no-match condition.

Some implementations acquire and store the multi-pattern authentication gesture in (or in a form similar to) an MPEG format. Such a format provides a time base and time based change frames that lend themselves to representing the multi-pattern authentication gesture. In addition, it is known how to track patterns in such a representation.

Some implementations acquire and store the multi-pattern authentication gesture as (or in a form similar to) an array of vectors or events.

In some implementations, the gesture library contains encrypted gesture templates. In such implementations the multi-pattern authentication gesture acquired by the 'acquire gesture' procedure 303 can be encrypted such that the 'search for gesture match' procedure 305 searches for a matching gesture template using only the encrypted forms and so do not expose the gesture templates or the multi-pattern authentication gesture. This can be performed using known techniques and correlation-preserving encryption tools for securely comparing biometric data.

No matter how the multi-pattern authentication gesture and gesture templates are stored, the 'sufficiently similar match' procedure 405 determines whether the multi-pattern authentication gesture and a gesture template are sufficiently similar (where the degree of similarity is parameterized in accordance with the required level-of-trust). In some implementations, the level-of-trust can be determined solely by whether the multi-pattern authentication gesture matches the gesture template. In other implementations, the level-of-trust can be assigned responsive to the degree of similarity of the match between the multi-pattern authentication gesture and the gesture template. In such implementations, assignment of a higher level-of-trust can require a more exact degree of similarity (thus more exactitude when gesticulating the multi-pattern authentication gesture) than assignment of a lower level-of-trust. The level-of-trust is generally assigned to a principal by associating one or more authentication credentials with the principal.

Because the gesture is intended to be secure, it will generally be complex. Thus, the user will need some training after defining a multi-pattern authentication gesture to help remember it and to develop the muscle memory needed to consistently reproduce the multi-pattern authentication gesture.

Figure 5:
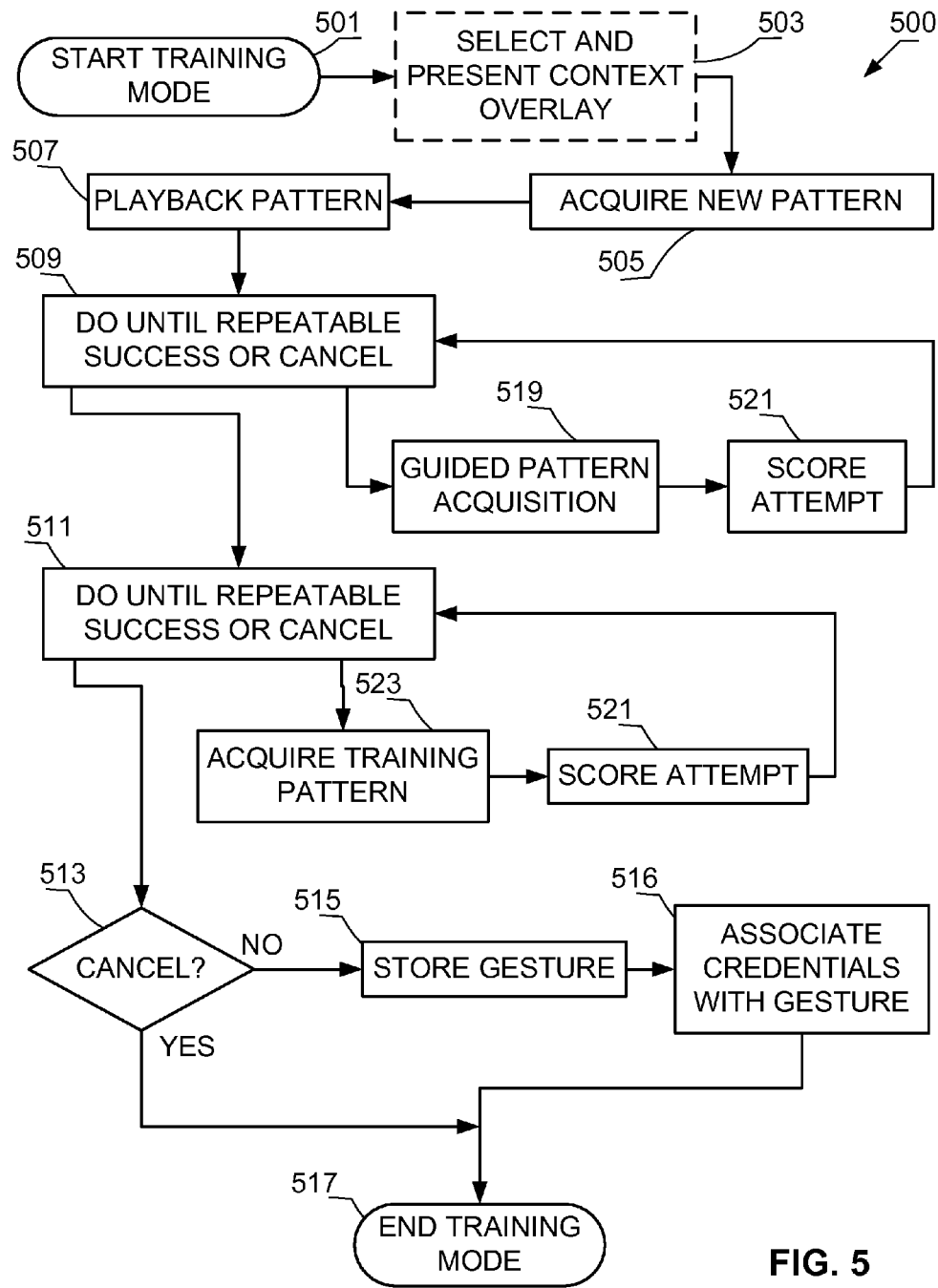
FIG. 5 illustrates a training process that can be used to help train the user to remember a multi-pattern authentication gesture.

FIG. 5 illustrates a training process 500 that can be used to train the user to remember a newly created multi-pattern authentication gesture. The training process 500 can be invoked by a program or process that has been invoked by a user who wants to register a new multi-pattern authentication gesture and associate it with an authentication credential. The training process 500 initiates at a start terminal 501 and can continue to an 'optional select context overlay' procedure 503 or to an 'acquire new pattern' procedure 505. The 'optional select context overlay' procedure 503 provides the user with the ability to select and/or create a gesture context that can be used to specify a domain for the multi-pattern authentication gesture. The gesture context can be represented by a context overlay (for example, an image that is presented on multi-touch sensor device) to help the user to define and use the multi-pattern input device in a particular domain (such as a drum, keyboard pattern etc. as subsequently discussed with respect to FIG. 7.

If the 'optional select context overlay' procedure 503 is provided it will continue to the 'acquire new pattern' procedure 505 after presenting the context overlay.

The 'acquire new pattern' procedure 505 acquires the new multi-pattern authentication gesture and can verify that none of the stored available gesture templates in the gesture library match the new gesture. The 'acquire new pattern' procedure 505 can also measure the complexity of the new multi-pattern authentication gesture and reject those that are too simple (for example, a multi-pattern authentication gesture resulting from dragging two fingers (each on a different edge) at the same speed on a multi-touch sensor device).

Once the new multi-pattern authentication gesture is acquired, a 'playback pattern' procedure 507 replays the multi-pattern authentication gesture to the user (in some implementations, repeating until stopped by the user). Next, the training process 500 continues to a 'do-until loop' procedure 509 that repeats a first training phase (subsequently described) and then to a 'do-until loop' procedure 511 that repeats a second training phase (subsequently described).

Once both training phrases are complete (either by the user canceling the training or by successful completion of the training), the training process 500 continues to a 'cancel' decision procedure 513 that determines whether the user canceled or successfully completed the training. If the user successfully completed the training, the training process 500 continues to a 'save gesture' procedure 515 that can encrypt the new multi-pattern authentication gesture (in a form that can be used with comparisons) and stores the (possibly encrypted) new multi-pattern authentication gesture as a gesture template in the gesture library. Once the gesture is stored, an 'associate credentials with gesture' procedure 516 associates the gesture with one or more authentication credentials. Finally, the training process 500 completes through an end terminal 517. If the user canceled the training, the training process 500 completes through the end terminal 517 without storing the new multi-pattern authentication gesture as a gesture template in the gesture library.

At the 'do-until loop' procedure 509, the user receives guided training on how to recreate the new multi-pattern authentication gesture. For each repetition, the training process 500 continues to a 'guided training pattern acquisition' procedure 519 that presents the new multi-pattern authentication gesture to the user while the user simultaneously attempts to recreate the new multi-pattern authentication gesture (thus, the 'guided training pattern acquisition' procedure 519 assists the user in duplicating the patterns and timing of the gesticulation). Next, a 'score' procedure 521 scores the user's just-completed gesture with the new multi-pattern authentication gesture by comparing the gestures. The 'do-until loop' procedure 509 continues until the user has successfully scored above a threshold sufficient to satisfy the requirements of the 'search for gesture match' procedure 305 for a number of sequential attempts.

At the 'do-until loop' procedure 511 the user recreates the new multi-pattern authentication gesture without guidance. A 'training pattern acquisition' procedure 523 acquires a multi-pattern authentication gesture from the user and the 'score' procedure 521 can be used to score the just-completed gesture. The repetition continues until the user has successfully scored above a threshold sufficient to satisfy the requirements of the 'search for gesture match' procedure 305 for a number of sequential attempts.

Some implementations of the training process 500 allow the new multi-pattern authentication gesture to be stored for a limited time (for example, a number of hours or days) to allow the user to solidify the new multi-pattern authentication gesture into long-term memory by practicing the gesticulation over that period. Some implementations provide a game-like teaching tool (like those used with non-standard keyboards) as a user training tool. Some implementations allow the user to switch between guided and non-guided modes as desired.

Figure 6:
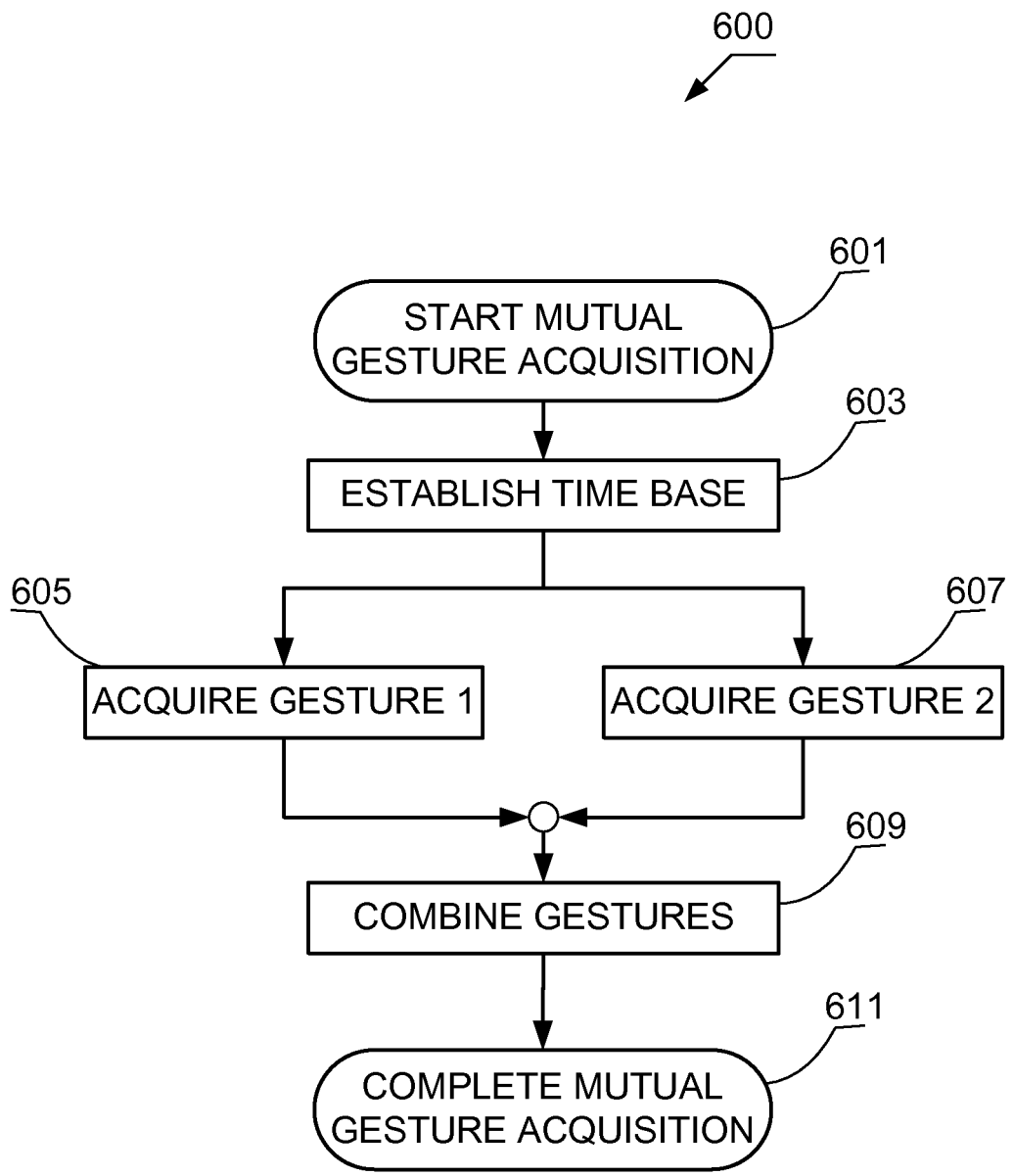
FIG. 6 illustrates a mutual gesture acquisition process.

FIG. 6 illustrates a mutual gesture acquisition process 600 that can be used to acquire multi-pattern authentication gestures from multiple and separate "pattern-input devices". This process can be used for example by a single user who has access to two "single-touch" devices (or two multi-touch devices) and who uses both devices when inputting a multi-pattern authentication gesture. Furthermore, the process can be used to acquire a multi-pattern authentication gesture that is created by multiple users, where the patterns that make up the gesture are separately, but synchronously input by each of the users. The mutual gesture acquisition process 600 can be used locally or over a network.

The mutual gesture acquisition process 600 can be invoked by the 'acquire gesture' procedure 303, initiates at a start terminal 601, and continues to an 'establish time base' procedure 603. The 'establish time base' procedure 603 establishes a common time reference for the time axis 201 to reference the patterns. Once the common time reference is established an 'acquire first gesture' procedure 605 and an 'acquire second gesture' procedure 607 are simultaneously invoked (for example, by starting separate threads-of-execution) to acquire the patterns from the multiple "pattern-input devices". Once the pattern(s) from each device is(are) received, a 'combine gestures' procedure 609 combines them into a multi-pattern authentication gesture suitable for processing by the 'search for gesture match' procedure 305. Finally, the multi-pattern authentication gesture is returned as the mutual gesture acquisition process 600 completes through an end terminal 611.

One skilled in the art will understand that the patterns returned by the 'acquire first gesture' procedure 605 and the 'acquire second gesture' procedure 607 can be a gesture (which contains multiple patterns) as well as a single pattern or even multiple patterns separated in the temporal dimension (with respect to one user) so long as the combination of patterns has an overlap in the temporal dimension between at least two of the patterns. The mutual gesture acquisition process 600 can also be used with the training process 500 described with respect to FIG. 5.

FIG. 7 illustrates examples of context overlays 700 that can be used to establish a gesture context to specify a domain for the multi-pattern authentication gesture. A musical keyboard overlay 701 can be used to establish a 12-tone context. A custom overlay 703 can be used to establish an arbitrary context for the user; and a drum head overlay 705 can be used to establish a percussion context. In the 12-tone and percussion contexts, audible feed back can be provided through earphones to keep the multi-pattern authentication gesture private.

FIG. 8 illustrates a multi-touch sensor device surface 800 that can have a device-specific gesture context. This context need not be defined by a context overlay, but by designated areas of the multi-touch sensor device. In this example, the active areas are a center point 801, an edge point 803 (one for each edge), and a corner point 805 (one for each corner). Thus, the patterns for the multi-pattern authentication gesture could be defined by the following actions: pressing on the top and bottom corner points of the multi-touch sensor device surface 800 for two seconds, followed within 200 ms by a swipe from the top left corner point to the top right corner point passing over the top edge point that takes 500 ms, for which the top edge point was hit within 100 ms.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as, for example but without limitation, a gesture library, an assignment logic, a context establishment logic, a gesture acquisition logic, a first gesture portion acquisition logic, a second gesture portion acquisition logic, a gesture comparison logic, a hint presentation logic, a gesture assembly logic, a morph logic, a template storage logic, a verification logic, etc.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology allows a user to use a multi-pattern authentication gesture to authenticate his/herself to a system. The multi-pattern authentication gesture can be one of multiple Factors used in the authentication or can be the only Factor used for the authentication.

From the foregoing, it will be appreciated that the technology has (without limitation) the following advantages:

1) The multi-pattern authentication gesture can have a strength similar to a biometric authentication Factor, while still allowing the multi-pattern authentication gesture to be shared between users.

2) The multi-pattern authentication gesture can be vastly harder to guess or acquire by observation than typical Factors known to a user.

3) The multi-pattern authentication gesture can morph over time such that prior versions of the multi-pattern authentication gesture no longer authenticate.

4) Because the multi-pattern authentication gesture can morph there the user need not be asked to periodically change a password or other Factor 2 knowledge.

5) The multi-pattern authentication gesture can be placed within a gesture context.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method for authenticating a principal comprising:
    using a computer to acquire a multi-pattern authentication input having a plurality of input patterns, each of said plurality of input patterns having a temporal dimension and comprising corresponding independent input made by a user, wherein at least two of said plurality of input patterns overlap in said temporal dimension, and wherein the multi-pattern authentication gesture comprises one or more portions of the temporal dimensions where positional dimension coordinates are absent, said multi-pattern authentication input having a duration;
    comparing whether said multi-pattern authentication gesture is sufficiently similar to an available gesture template over a portion of said duration, wherein the comparing comprises determining whether one or more durations during which the positional dimension coordinates are absent are sufficiently similar to one or more durations for the available gesture template;
    upon determining that said multi-pattern authentication gesture is sufficiently similar to an available gesture template over the portion of said duration to allow at least some trust to said principal, determining a level-of-trust for said principal based on a degree of similarity of a match between the multi-pattern authentication gesture and the gesture template, wherein determining the level-of-trust comprises assigning a higher level-of-trust for more exact degree of similarity and a lower level-of-trust for a less exact degree of similarity, wherein the higher level-of-trust provides a level of access that includes a level of access that the lower level-of-trust provides; and
    assigning a level-of-trust to said principal responsive to comparing.

2. The computer controlled method of claim 1, wherein said level-of-trust is associated with one or more authentication credentials.

3. The computer controlled method of claim 1, further comprising:
    verifying that said multi-pattern authentication gesture is reproducible; and
    storing said available gesture template corresponding to said multi-pattern authentication gesture.

4. The computer controlled method of claim 1, further comprising presenting a gesture hint.

5. The computer controlled method of claim 1, wherein acquiring further comprises:
    acquiring a first multi-pattern authentication gesture having a first duration;
    acquiring a second multi-pattern authentication gesture having a second duration, said first duration and said second duration overlapping in said temporal dimension for an overlap duration; and
    combining said first multi-pattern authentication gesture and said second multi-pattern authentication gesture to form said multi-pattern authentication gesture and wherein said portion of said duration includes a portion of said overlap duration.

6. The computer controlled method of claim 1, wherein said available gesture template morphs responsive to a drift history.

7. An apparatus having computer for authenticating a principal, said apparatus comprising:
    a processor;
    a gesture acquisition logic configured to acquire a multi-pattern authentication gesture having a plurality of input patterns, each of said plurality of input patterns having a temporal dimension and comprising corresponding independent gesticulations made by a user, wherein at least two of said plurality of input patterns overlap in said temporal dimension, and wherein the multi-pattern authentication gesture comprises one or more portions of the temporal dimensions where positional dimension coordinates are absent, said multi-pattern authentication gesture having a duration;
    a gesture comparison logic configured to compare whether said multi-pattern authentication gesture acquired by the gesture acquisition logic is sufficiently similar to an available gesture template over a portion of said duration, wherein, while comparing the multi-pattern authentication gesture, the gesture comparison logic is configured to determine whether one or more durations during which the positional dimension coordinates are absent are sufficiently similar to one or more durations for the available gesture template;
    a level-of-trust-determination logic configured to, upon the gesture comparison logic determining that said multi-pattern authentication gesture is sufficiently similar to an available gesture template over the portion of said duration to allow at least some trust to said principal, determine a level-of-trust for said principal based on a degree of similarity of a match between the multi-pattern authentication gesture and the gesture template, wherein determining the level-of-trust comprises assigning a higher level-of-trust for more exact degree of similarity and a lower level-of-trust for a less exact degree of similarity, wherein the higher level-of-trust provides a level of access that includes a level of access that the lower level-of-trust provides; and
    assignment logic configured to assign the level-of-trust to said principal.

8. The apparatus of claim 7, wherein said level-of-trust is associated with one or more authentication credentials.

9. The apparatus of claim 7, further comprising:
a verification logic configured to verify that said multi-pattern authentication gesture is reproducible; and
a template storage logic, responsive to the verification logic, configured to store said available gesture template corresponding to said multi-pattern authentication gesture.

10. The apparatus of claim 7, further comprising a hint presentation logic configured to present a gesture hint prior to completion of the gesture acquisition logic.

11. The apparatus of claim 7, wherein the gesture acquisition logic further comprises:
a first gesture portion acquisition logic configured to acquire a first multi-pattern authentication gesture having a first duration;
a second gesture portion acquisition logic configured to acquire a second multi-pattern authentication gesture having a second duration, said first duration and said second duration overlapping in said temporal dimension for an overlap duration; and
a gesture assembly logic configured to combine said first multi-pattern authentication gesture and said second multi-pattern authentication gesture to form said multi-pattern authentication gesture and wherein said portion of said duration includes a portion of said overlap duration.

12. The apparatus of claim 7, further comprising a morph logic configured to morph said available gesture template responsive to a drift history.

13. A non-transitory computer program product comprising for authenticating a principal comprising:
a computer-usable data carrier providing instructions that, when executed by a computer, cause said computer to perform a method comprising:
acquiring a multi-pattern authentication gesture having a plurality of input patterns, each of said plurality of input patterns having a temporal dimension and comprising corresponding independent gesticulations made by a user, wherein at least two of said plurality of input patterns overlap in said temporal dimension, and wherein the multi-pattern authentication gesture comprises one or more portions of the temporal dimensions where positional dimension coordinates are absent, said multi-pattern authentication gesture having a duration;
comparing whether said multi-pattern authentication gesture is sufficiently similar to an available gesture template over a portion of said duration, wherein the comparing comprises determining whether one or more durations during which the positional dimension coordinates are absent are sufficiently similar to one or more durations for the available gesture template;
upon determining that said multi-pattern authentication gesture is sufficiently similar to an available gesture template over the portion of said duration to allow at least some trust to said principal, determining a level-of-trust for said principal based on a degree of similarity of a match between the multi-pattern authentication gesture and the gesture template;
and assigning the level-of-trust to said principal.

14. The computer program product of claim 13, wherein said level-of-trust is associated with one or more authentication credentials.

15. The computer program product of claim 13, further comprising:
verifying that said multi-pattern authentication gesture is reproducible; and
storing said available gesture template corresponding to said multi-pattern authentication gesture.

16. The computer program product of claim 13, further comprising presenting a gesture hint.

17. The computer program product of claim 13, wherein acquiring further comprises:
acquiring a first multi-pattern authentication gesture having a first duration;
acquiring a second multi-pattern authentication gesture having a second duration, said first duration and said second duration overlapping in said temporal dimension for an overlap duration; and
combining said first multi-pattern authentication gesture and said second multi-pattern authentication gesture to form said multi-pattern authentication gesture and wherein said portion of said duration includes a portion of said overlap duration.

18. The computer-controlled method of claim 1, wherein at least two of said plurality of input patterns overlap in said temporal dimension when:
a first input pattern from the at least two of said plurality of input patterns commences before at least one other input pattern from the at least two of said plurality of input patterns commences.

* * * * *